United States Patent
Murakami et al.

[11] Patent Number: 6,072,675
[45] Date of Patent: Jun. 6, 2000

[54] CONTROL DEVICE FOR BORING MACHINE

[75] Inventors: Keiichi Murakami; Michihiro Shoji, both of Tokyo, Japan

[73] Assignee: Nitto Kohki Co., Ltd., Tokyo, Japan

[21] Appl. No.: 09/180,227

[22] PCT Filed: Mar. 18, 1997

[86] PCT No.: PCT/JP97/00878

§ 371 Date: Nov. 3, 1998

§ 102(e) Date: Nov. 3, 1998

[87] PCT Pub. No.: WO97/45222

PCT Pub. Date: Dec. 4, 1997

[30] Foreign Application Priority Data

May 28, 1996 [JP] Japan ..................... 8-154786

[51] Int. Cl.[7] .................................................. H02H 5/00
[52] U.S. Cl. ........................................ 361/23; 361/115
[58] Field of Search ................ 361/23, 115, 93.1, 361/18

[56] References Cited

U.S. PATENT DOCUMENTS

| | | | |
|---|---|---|---|
| 4,278,371 | 7/1981 | Meyer | 408/76 |
| 5,007,776 | 4/1991 | Shoji | 408/6 |
| 5,087,157 | 2/1992 | Shoji et al. | 408/9 |
| 5,096,339 | 3/1992 | Shoji | 408/6 |

FOREIGN PATENT DOCUMENTS

| | | | |
|---|---|---|---|
| 56-126507 | 10/1981 | Japan | B23B 45/14 |
| 4-89611 | 8/1992 | Japan | B23B 47/18 |
| 4-97603 | 8/1992 | Japan | B23B 49/00 |

*Primary Examiner*—Stephen W. Jackson
*Attorney, Agent, or Firm*—Westman, Champlin & Kelly, P.A.

[57] ABSTRACT

The operation of an electric drill is inhibited when it is interrupted by an abrupt fault such as power failure and then the fault is recovered, or when the coil of an electromagnet has a trouble such as disconnection.

After the fault is eliminated with a power switch 50 remaining closed for energizing the electromagnet and the electric drill, a photocoupler 38 turns on a thyristor 31 to disable the conduction of a transistor 35. As the result, a drill motor 16 will not start before the magnetization of the electromagnet. The trouble in the coil 27 is detected by a potential examining circuit 30 measuring a potential difference across a resistor 31. The detection of the trouble causes the thyristor 31 to interrupt the conduction of the transistor 35. Accordingly, the electric drill will not start again unless it is securely anchored by the electromagnet.

6 Claims, 3 Drawing Sheets

6,072,675

CONTROL DEVICE FOR BORING MACHINE

TECHNICAL FIELD

The present invention relates to a drill controlling apparatus and particularly, a drill controlling apparatus for use with an electric drill securely anchored to a support or a work piece to be drilled (referred to as a workpiece hereinafter) by the action of an electromagnet, which allows the electromagnet to remain magnetized during the operation of the electric drill.

BACKGROUND ART

A drilling machine having an electric drill supported by a frame which includes an electromagnet(s) in the bottom is known. In drilling operation, the frame is securely anchored to a workpiece by the action of the electromagnet. A common procedure of the drilling operation of the drilling machine will be described. The procedure starts with positioning the frame with the electromagnet on the workpiece and energizing the electromagnet to secure the drilling machine to the workpiece by its electromagnetic force. Then, the motor of electric drill is energized to drill a hole in the workpiece. The electric drill may be moved downward or forwarded by either manual action with a handle or automatic feeding with a motor.

A conventional controlling apparatus for energizing the electromagnet and the drill motor is shown in FIG. 4, in which an AC power source 3 is connected between two terminals 1 and 2. The AC power source 3 is connected via a main switch 4 to a rectifier 6 of which output is connected to a coil 7a of the electromagnet. Also, the AC power source 3 is connected 8 to a motor 9 of the electric drill via the main switch 4 and a normally open contact 8a of a relay. It is further connected by a drill start switch 5 to the relay 8 and a stop switch 11. The drill start switch 5 is connected in parallel with another normally open contact 8b of the relay 8.

In action, when the main switch 4 is closed, a voltage from the AC source 3 is rectified by the rectifier 6 to be applied to the coil 7a of the electromagnet for magnetization. After confirming that the drilling machine is securely anchored to a workpiece by the action of the electromagnet, the operator presses down the drill start switch 5 to actuate the relay 8. When the two contacts 8a and 8b of the relay 8 are closed, the drill motor 9 starts rotating for carrying out the drilling action. Once the drill start switch 5 is pressed, the contact 8b remains closed to maintain the state of the relay 8. To stop the electric drill, the stop switch 11 is pressed to disable the relay 8. For removing the drilling machine from the workpiece after completion of the drilling operation, the main switch 4 is turned off to deenergize the coil 7a.

The conventional drilling machine allows the motor 9 to stop immediately when the energization is interrupted by an abrupt fault such as power failure or accidental unplugging during the drilling operation. Since the power interruption causes the relay 8 to open its contacts, the electric drill is prevented from unexpectedly starting again after the fault is eliminated and the source power is recovered. More specifically, when the connection to the AC source is recovered, the coil 7a starts magnetizing the electromagnet but the drill motor 9 remains deenergized with the relay 8 being opened unless the drill start switch 5 is pressed once again. However, such a controlling circuit of the conventional drilling machine requires the stop switch 11 for canceling the closing of the relay 8 in addition to the main switch 4 and the drill start switch 5. As the three switches in total are installed, they will be troublesome in control operation and also increase the overall cost.

If the coil 7a of the electromagnet has a fault such as disconnection or shortcircuit, the magnetization of the electromagnet is interrupted. The disconnection in the coil 7a may be detected through monitoring the flow of current in the coil 7a, which allows the drill motor 9 to be stopped immediately. It is however difficult to locate any shortcircuit in the coil 7a or, if a double coil type magnetizing system is employed, to identify disconnection in only one of the two coils connected in parallel.

It is an object of the present invention to provide a drill controlling apparatus which incorporates a simple switching system for controlling the restart of an electric drill upon the recovery from power failure and responding to any fault in an electromagnet used for securely anchoring the electric drill.

DISCLOSURE OF INVENTION

For overcoming the prescribed disadvantage and achieving the above object, the following features of the present invention are proposed. A first feature of the present invention is implemented by a fault examining means for producing a fault signal when a magnitude of the current which is supplied to the electromagnet provided for securely anchoring the frame that supports the motor-driven electric drill for vertical movement, is not within a predetermined allowable range, and an energization inhibiting means responsive to the fault signal for inhibiting energization of the motor.

A second feature of the present invention is implemented by an energization inhibiting means which is disabled when the electromagnet and the motor are energized in this order and enabled when both the electromagnet and the motor are energized at substantially the same time.

A third feature of the present invention is implemented by the fault examining means for producing the fault signal when a magnitude of the current supplied to the electromagnet is not within the predetermined allowable range, a first energization inhibiting means responsive to the fault signal for inhibiting energization of the motor, and a second energization inhibiting means for inhibiting energization of the motor and which is disabled when the electromagnet and the motor, the second energization inhibiting means are energized in this order, while enabled when both the electromagnet and the motor are energized at substantially the same time.

A fourth feature of the present invention is implemented by a normally open relay contact connected in series to the motor, a relay for actuating the normally open relay contact, a first switching element connected in series to the relay, a current detecting means for detecting a current supplied to the electromagnet, a fault examining means for producing a fault signal when a magnitude of the current detected by the current detecting means is not within a predetermined allowable range, and an energization inhibiting means responsive to the fault signal for disconnecting the first switching element.

According to a fifth feature of the present invention, the energization inhibiting means is a second switching element which is turned on in response to the fault signal.

According to a sixth feature of the present invention, the current detecting means is a resistor connected in series to the electromagnet, and the fault examining means is a potential examining means which provide a fault signal when a magnitude of the potential across the resistor is not within the predetermined allowable range.

A seventh feature of present invention is implemented by a normally open relay contacts connected in series to the motor, a relay for actuating the normally open relay contact, a first switching element connected in series to the relay, and an energization inhibiting means for inhibiting energization of the relay when both the electromagnet and the motor are energized at substantially the same time.

According to an eighth feature of the present invention, the energization inhibiting means comprises a photocoupler (or an optical coupler) which is turned on when both the electromagnet and the motor are energized at substantially same time, a second switching element responsive to the turning on of the photocoupler for maintaining the first switching element opened to inhibit energization of the relay, and a delay switching means which is enabled at a predetermined time of delay when the electromagnet has been energized and maintains the photocoupler turned off after it has been enabled.

Each of the first, and third to sixth features permit the energization of the drill motor to be inhibited when a magnitude of the current through the coil is out of the allowable range. More particularly, when the current in the coil is not normal, the first switching element connected in series to the relay is turned off to open the relay and thus disconnect the motor of the electric drill for stopping the rotation. The sixth feature also allows the potential examining circuit to actuate the second switching element when the potential across the resistor is out of the allowable range, i.e. the coil of the electromagnet is shortcircuited or disconnected. This action opens the first switching element connected in series to the relay and thus deenergizes the relay to interrupt the rotation of the electric drill.

Each of the second, third, seventh and eighth features causes the energization inhibiting means, i.e. a photocoupler, operative to inhibit the energization of the relay, of which normally open contact is connected in series to the motor, hence preventing the actuation of the motor, when the power supply is started with the power switch being its position supplying the power to both the electromagnet and the motor, e.g. in case that after the drilling operation is interrupted by power failure and then the power failure is recovered. When the electromagnet and the motor are correctly energized in this order in normal operation, the delay switching means or the delay switching element disables the turning on of the energization inhibiting means or the photocoupler and allows the energization of the motor.

BEST MODE FOR CARRYING OUT THE INVENTION

Figure 2:
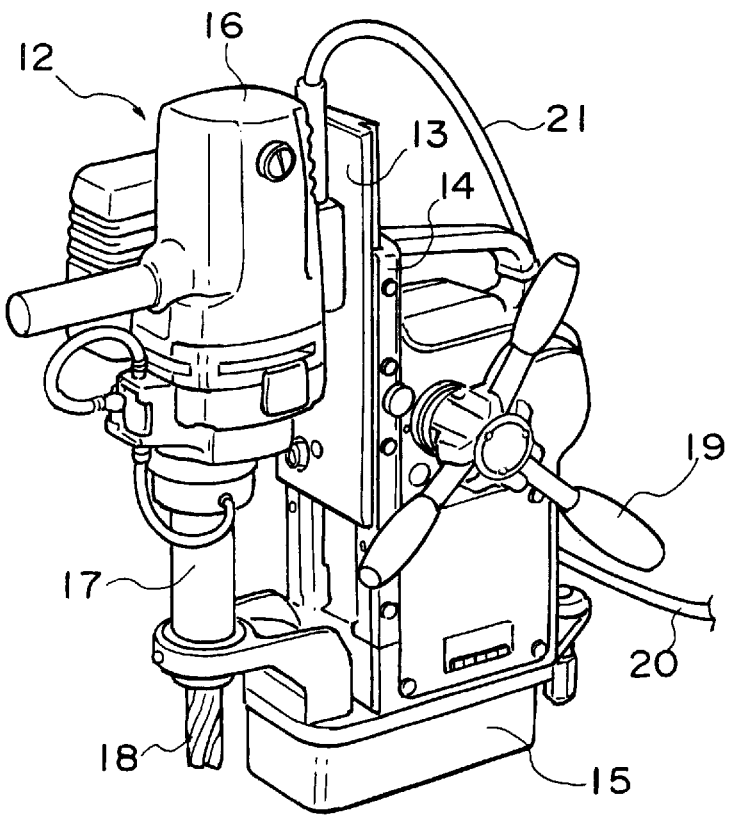
FIG. 2 is a perspective view showing a drill machine suited for use with the apparatus of the present invention.

One preferred embodiment of the present invention will be described in more detail referring to the accompanying drawings. FIG. 2 is a schematic perspective view of a drill machine suited for use with a drill controlling apparatus according to the present invention. As shown, the electric drill machine 12 is fixedly mounted to a slide plate 13 which is slidably mounted to a frame 14 so that it can travel vertically on the frame 14. The frame 14 is joined at the lower end to a base 15 which contains an electromagnet (not shown) for electromagnetic anchoring. The electric drill 12 comprises an electric motor 16 mounted in the top thereof and a spindle arbor 17 to which a tool 18 such as a drill bit or a hole-saw is detachably installed with facing downward. The frame 14 has a handle 19 for vertical movement of the slide plate 13. The handle 19 also serves as an on/off operating lever for allowing a clutch to control an automatic feeding action of the slide plate 13.

The drill controlling apparatus of the present invention is installed in the frame 14 and its operating switches are located on the back of the frame 14 as not shown. The drill controlling apparatus is energized through a cable 20 and is electrically joined by a cable 21 to the motor 16 for supplying power.

Figure 1:
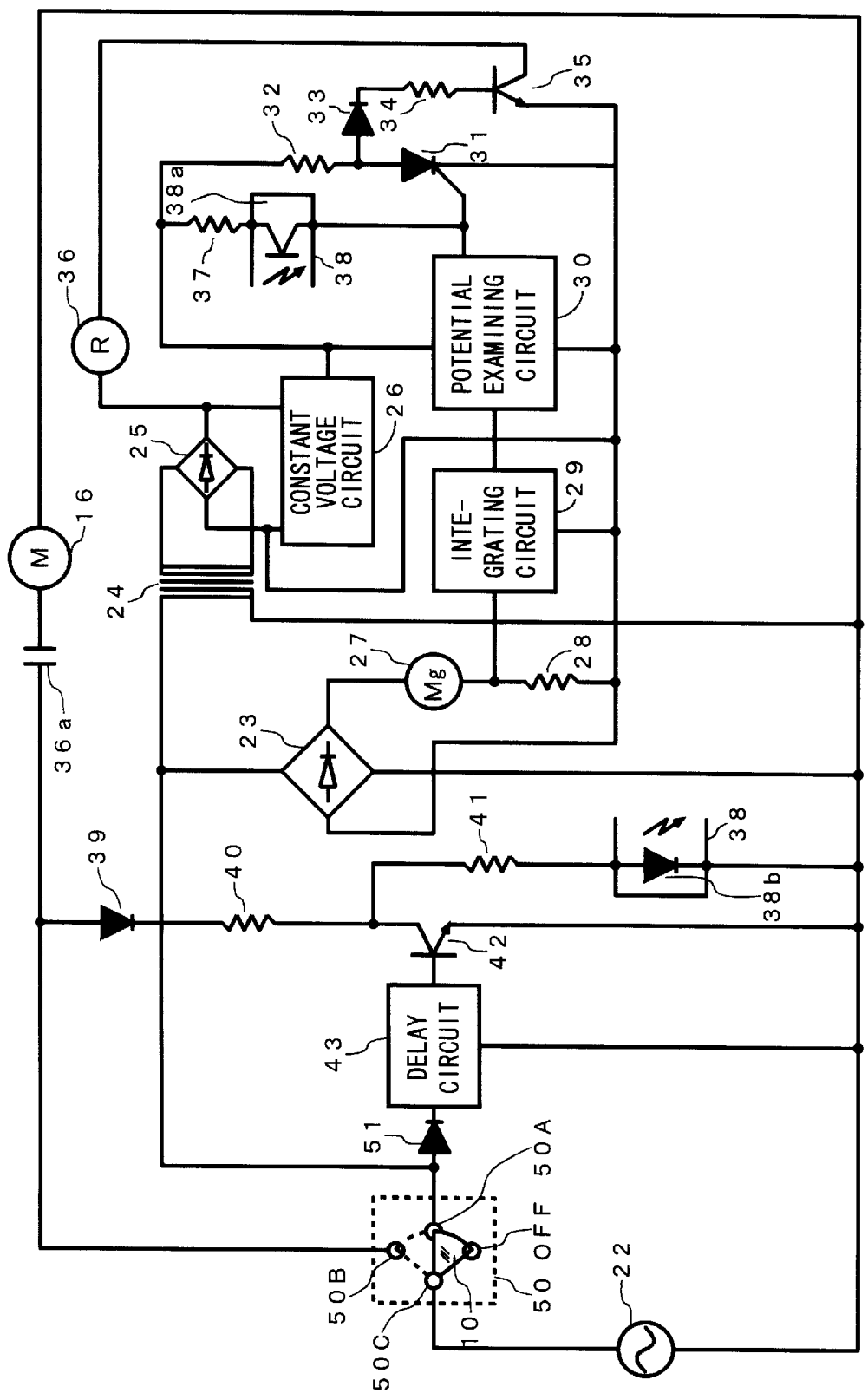
FIG. 1 is a circuitry diagram of a drill controlling apparatus according to one embodiment of the present invention.

FIG. 1 illustrates a circuit diagram of the drill controlling apparatus of the present invention, in which known and conventional components are simplified and grouped in blocks. The drill controlling apparatus has a manual control switch 50 for connecting the power supply to the electromagnet and the electric drill 12. The control switch 50 is of a rotary type for energizing the electromagnet and the electric drill 12 in predetermined sequence.

The control switch 50 has a common contact 50C, an off contact OFF, a contact 50A for energizing the electromagnet, and a contact 50B for energizing the electric drill 12. The switching between the contacts is carried out by pivotal movement of a contactor 10 which is tailored in dimensions for connecting with the two contacts 50A and 50B at a time. In FIG. 1, the common contact 50C is shown to be connected with the contact 50A. When the contactor 10 is turned in a counter-clockwise direction, the common contact 50C can be connected to both of the two contacts 50A and 50B as denoted by the dotted line. The switch 50 is not limited to the rotary type but may be of any appropriate type which can energize the electromagnet and the electric drill 12 in this sequence and more specifically, allows the electromagnet to be powered prior to the electric drill 12.

When the counter-clockwise movement of the contactor 10 of the switch 50 causes the contact 50C to switch from the contact OFF to the contact 50A, a coil 27 of the electromagnet mounted in the base 15 is energized, which will be explained later in more detail. This is followed by connecting the contact 50C to the contact 50B to start the motor 16 of the electric drill 12.

As the two contacts 50C and 50A of the switch 50 have been connected to each other, an AC output of the AC power source 22 is full-wave rectified by a first full-wave rectifier circuit 23 which may consist of a bridge circuit. The AC power source 22 is also connected to the primary side of a transformer 24 and an AC output released from the secondary side of the transformer 24 is full-wave rectified by a second full-wave rectifier circuit 25. A constant voltage circuit 26 is provided for generating a constant voltage from a DC output of the second full-wave rectifier circuit 25.

A DC output of the first full-wave rectifier circuit 23 is fed to the coil 27 of the electromagnet and to a resistor 28 connected in series to the coil 27. The DC current energizes the electromagnet and causes the resistor 28 to develop a potential V1 thereacross. The potential V1 is smoothed by an integrating circuit 29 and then examined by a potential examining circuit 30 whether or not it falls within a predetermined allowable range. In response to a result of the examination, the output of the potential examining circuit 30 is either positive or negative. More particularly, when the potential V1 is within the allowable range, the output is negative. If the potential V1 is out of the allowable range, the output of the potential examining circuit 30 is positive. The potential examining circuit 30 may be composed of a window comparator circuit which will be explained later referring to FIG. 3.

The output of the potential examining circuit 30 is connected to the gate of a thyristor 31 which is connected in series to a resistor 32. The constant voltage outputted from the constant voltage circuit 26 is supplied to the series connection of the thyristor 31 and the resistor 32. A junction node between the anode of the thyristor 31 and the resistor 32 is connected to the anode of a diode 33. The cathode of the diode 33 is connected to the base of a switching transistor 35 via a resistor 34.

The collector of the transistor 35 is connected to the positive output of the second full-wave rectifier circuit 25 via a relay 36 and the emitter thereof to the negative output or reference potential. The light receiver 38a of a photocoupler 38 is interposed with a resistor 37 between the positive output of the second full-wave rectifier circuit 25 and the gate of the thyristor 31.

The contact 50B is connected to the motor 16 of the electric drill 12 via the normally open contact 36a of a relay 36 for feeding a power supply from the AC power source 22. In operation, when the switch 50 is operated to connect between the two contacts 50C and 50A, the relay 36 is enabled and closes its contact 36a. Then, when the switch 50 is further turned to the next position, it connects the contact 50C to the contact 50B to energize the drill motor 16.

In case that the coil 27 is broken or shortcircuited producing a short- or over-current, the potential V1 across the resistor 28 comes out of the allowable range hence shifting the output of the potential examining circuit 30 to positive. Accordingly, the thyristor 31 is loaded at its gate with a positive potential and becomes conductive. This causes the base potential of the transistor 35 to drop. As the transistor 35 is turned to the off state, the relay 36 is disabled. Finally, the contact 36a is opened disconnecting the power supply from the motor 16.

The allowable range of reference potential is carefully predetermined such that the potential V1 across the resistor 28 stays within the allowable range in a normal condition where the coil 27 is not broken or shortcircuited. If a fault occurs in the circuit of the coil and the potential V1 comes out of the allowable range, the output of the potential examining circuit 30 is turned to positive. More particularly, if the electromagnet is malfunctioned, the power supply to the motor 16 is systematically disconnected.

Also, when the light receiver 38a of the photocoupler 38 receives a beam of light and turns on, the thyristor 31 becomes conductive and interrupts the energization of the motor 16. The above-mentioned circuitry arrangement allows the motor 16 to be deenergized by the action of the photocoupler 38.

The photocoupler 38 has a light emitter (or light emitting element) 38b thereof connected to a series circuit which comprises a rectifying diode 39 and resistors 40 and 41 so that the light emitter 38b emits light when energized by the AC power source 22. The series circuit is hence connected to the AC power source 22 via the contact 50B of the switch 50. A series circuit section of the light emitter 38b and the resistor 41 is connected in parallel to a collector/emitter circuit of a transistor 42. A delay circuit 43 is connected between the contact 50A of the switch 50 and the base of the transistor 42. Also, a diode 51 is interposed on the input side of the delay circuit 43 for rectification.

For starting the drilling operation with the drill controlling apparatus shown in FIG. 1, the switch 50 is first turned one step in the counter-clockwise direction to connect between the two contacts 50C and 50A. This causes the coil 27 to magnetize the electromagnet which is in turn attracted toward and held on a workpiece (not shown). Simultaneously, the relay 36 is enabled to close its contact 36a for being ready for supplying the motor 16 with the source power. Then, after a time of delay determined by the delay circuit 43, the base of the transistor 42 is loaded with a forward bias. When the switch 50 is further turned by one step to close between the contact 50C and the contact 50B, the motor 16 starts rotating so that the drilling operation begins. At the time, the transistor 42 is conductive and the light emitter 38b of the photocoupler 38 remains deenergized illuminating no light.

If the power supply is accidentally interrupted due to an electrical fault such as power failure and then recovered during the drilling operation, the connection of the contact 50C to the two contacts 50A and 50B in the switch 50 remains thus energizing the light emitter 38b of the photocoupler 38 before allowing the delay circuit 43 to feed the forward bias to the base of the transistor 42. When the light receiver 38a receives a light from the light emitter 38b and causes the photocoupler 38 to be conductive, the forward bias is transmitted to the gate of the thyristor 31 which in turn becomes conductive. Accordingly, the transistor 35 is loaded at its base with a low level of the potential and remains not conductive. This keeps the relay 36 opened hence continuing to deenergize the motor 16. As the result, the electric drill 12 will be prevented from abrupt actuation after the power failure is eliminated. The thyristor 31 remains conductive once it is turned to its conductive state. It is thus necessary for restarting the drilling operation that the switch 50 is returned to the initial position for disconnecting the power supply and then, switched to connect the contact 50A and the contact 50B in a sequence.

Figure 3:
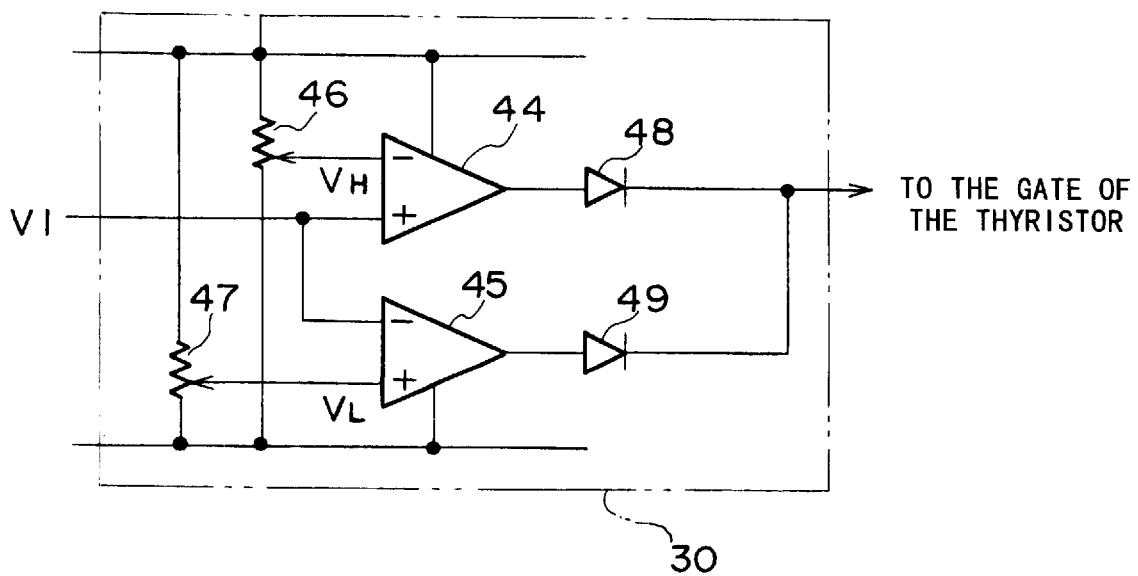
FIG. 3 is a diagram showing a potential examining circuit of the apparatus.
Figure 4:
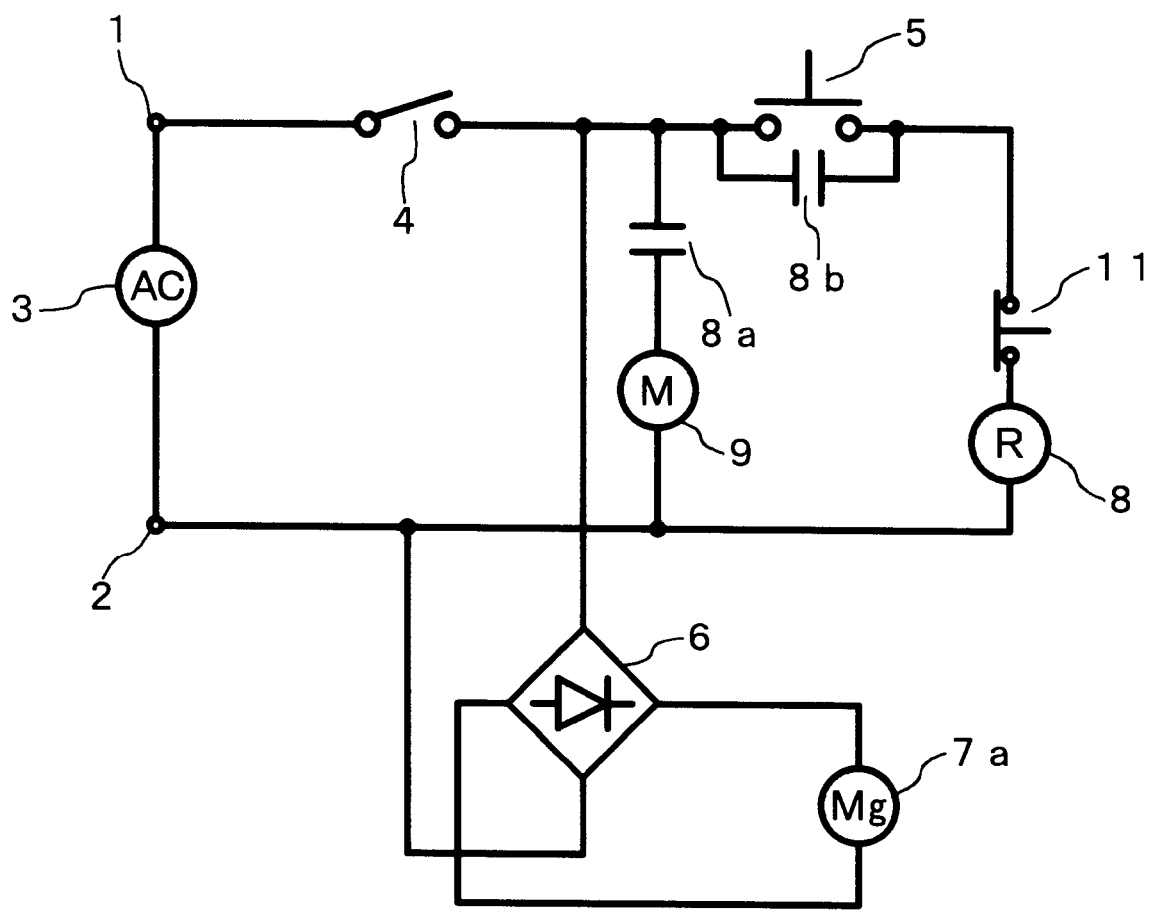
FIG. 4 is a circuitry diagram of a conventional drill controlling apparatus.

The potential examining circuit 30 will be explained in more 5 detail. Referring to FIG. 3, the potential examining circuit 30 comprises a first and a second comparators 44 and 45. The output potential of the integrating circuit 29 or an average value of the potential V1 is fed to the positive input of the first comparator 44 and the negative input of the second comparator 45. The negative input of the first comparator 44 and the positive input of the second comparator 45 are loaded with an upper-limit reference potential VH and a lower-limit reference potential VL which are determined, respectively, by a combination of the constant voltage circuit 26 and their respective variable resistors 46 and 47. The two comparators 44 and 45 are connected at their outputs to the anodes of diodes 48 and 49 respectively. The cathodes of the diodes 48 and 49 are then connected to the gate of the thyristor 31.

The reference potentials VL and VH are designated so that when the potential V1 is within the allowable range (between VH and VL), both outputs of the two comparators 44 and 45 are negative, while when it is out of the allowable range, one of the two comparator outputs is turned to positive. This permits the potential V1 to be out of the allowable range when a fault, e.g. disconnection or shortcircuit, occurs in the coil 27 of the electromagnet and keep the relay 36 and the motor 16 disabled.

In the embodiment of the present invention, after the drilling operation is interrupted by a power failure, even if the power and source is recovered, the relay 36 remains disabled to deenergize the relay 36 and motor 16 unless the switch 50 is reset. Also, if the coil 27 has a trouble, the relay 36 remains disabled before the trouble on the coil 27 is eliminated. The present invention is applicable to either a single or double coil type (two coils being connected in parallel) of the coil 27. In case of the double coil type, an occurrence of an electrical fault, e.g. disconnection or shortcircuit, in one of the two coils may vary a combined resistance of the two coils. The same action of responding to the fault is expected by designating the two limit potentials VH and VL to such values that a change in the combined resistance causes the potential V1 to be out of the allowable range.

Although the above embodiment is described with a combination of a first circuit for deenergizing the motor 16 upon occurrence of a fault in the coil 27 and a second circuit for restraining the motor 16 to be unexpectedly driven after the drilling operation is interrupted by any electrical fault, e.g. power failure or unplugging, and then the electrical fault is recovered, it is not of limitation. Any of the two circuits may independently be used for providing corresponding advantages.

The photocoupler 38 may be substituted with a relay. The relay is connected at its coil in place of the light emitter 38b of the photocoupler 38 to the resistor 41 and at its normally open contact in place of the light receiver 38a to the resistor 37.

Although the two full-wave rectifier circuits 23 and 25 are provided respectively for two of DC power supplies in FIG. 1, they may be substituted by a single common DC source which also can energize the delay circuit 43.

INDUSTRIAL APPLICABILITY

As set forth above, the present invention allows the operation of the drill motor to be inhibited when the coil of an electromagnet has a trouble such as disconnection or shortcircuit. Accordingly, the drill will be operated only when securely anchored to a workpiece.

According to the present invention, when the drill motor is interrupted by a fault such as power failure and then the fault is recovered, only the resetting action of an operator permits the motor to start again. The drilling operation is started again by a minimum procedure of controlling the switch and will thus be improved in both cost saving and operability.

What is claimed is:

1. A drill controlling apparatus for a machine, the machine having a drill driven by an electric motor, a frame supporting the drill for vertical movement, and an electromagnet for anchoring the frame, comprising:

a first switch for supplying electric power to the electromagnet;

a second switch for supplying electric power to the motor; and, an energization inhibiting means for inhibiting energization of the motor when both the first and second switches are on at the same time as the start of the supply of the electric power.

2. A drill controlling apparatus according to claim 1, wherein the first and the second switches are constructed so as to cause the first switch to be turned on while the second switch is turned on.

3. A drill controlling apparatus for a machine, the machine having a drill driven by an electric motor, a frame supporting the drill for vertical movement, and an electromagnet for anchoring the frame, comprising:

a fault examining means for generating a fault signal when a magnitude of a current supplied to the electromagnet is not within a predetermined allowable range;

an energization inhibiting means responsive to the fault signal for inhibiting energization of the motor;

a first switch for supplying electric power to the electromagnet;

a second switch for supplying electric power to the motor; and, a second energization inhibiting means for inhibiting energization of the motor when electric power is supplied simultaneously through both the first and the second switches for starting to supply the electric power to the electromagnet and the motor.

4. A drill controlling apparatus according to claim 3, wherein the first and the second switches are constructed so as to cause the first switch to be turned on while the second switch is turned on.

5. A drill controlling apparatus for a machine, the machine having a drill driven by an electric motor, a frame supporting the drill for vertical movement, and an electromagnet energizable for anchoring the frame, comprising:

a normally open relay contact connected in series to the motor;

a relay for actuating the normally open relay contact;

a first switching element connected in series with the relay;

an energization inhibiting means for inhibiting energization of the relay when the first switching element closes to connect a power source to the relay less than a predetermined time of delay after the electromagnet is energized; and a release means for releasing the energization inhibiting means to start the electric motor when the first switching element is closed after the electromagnet has been energized and the electromagnet has been energized for the predetermined time of delay.

6. A drill controlling apparatus according to claim 5, wherein the energization inhibiting means comprises a photocoupler which is turned on when both the electromagnet and the motor are energized at the same time, and a second switching element responsive to the turning on of the photocoupler for maintaining the first switching element opened to inhibit energization of the relay; and the release means comprises a delay switching means which is enabled at a predetermined time of delay after the electromagnet is energized, which maintains the photocoupler turned off after once enabled.

* * * * *